July 31, 1945.  J. E. CLARK ET AL  2,380,502
ELECTRONIC DISCHARGE DEVICE
Filed Dec. 4, 1943  7 Sheets-Sheet 1

INVENTORS: J. E. CLARK
C. E. FAY
V. L. RONCI
BY
Walter C. Kiesel
ATTORNEY

July 31, 1945.　　J. E. CLARK ET AL　　2,380,502
ELECTRONIC DISCHARGE DEVICE
Filed Dec. 4, 1943　　7 Sheets-Sheet 2

INVENTORS:  J.E. CLARK
C.E. FAY
V.L. RONCI
BY
*Walter E. Kiesel*
ATTORNEY

INVENTORS: J. E. CLARK
C. E. FAY
V. L. RONCI
BY
Walter C. Kiesel
ATTORNEY

INVENTORS: J. E. CLARK
C. E. FAY
V. L. RONCI
BY Walter G. Kiesel
ATTORNEY

July 31, 1945.   J. E. CLARK ET AL   2,380,502
ELECTRONIC DISCHARGE DEVICE
Filed Dec. 4, 1943   7 Sheets-Sheet 7

INVENTORS:  J. E. CLARK
C. E. FAY
V. L. RONCI
BY
Walter C. Kiesel
ATTORNEY

Patented July 31, 1945

2,380,502

UNITED STATES PATENT OFFICE 2,380,502

ELECTRONIC DISCHARGE DEVICE

James E. Clark, Williston Park, N. Y., Clifford E. Fay, Chatham, N. J., and Victor L. Ronci, New York, N. Y., assignors to Bell Telephone Laboratories, Incorporated, New York, N. Y., a corporation of New York Application December 4, 1943, Serial No. 512,918

20 Claims. (Cl. 250—27.5)

This invention relates to electronic discharge devices of high power capacity and more particularly to such devices of the continuously evacuated type adaptable to be readily demountable to renew replaceable elements therein.

A primary object of the invention is to obtain high efficiency in the transmission of the high power output in the device.

Another object of the invention is to facilitate the transfer of electronic energy within the device with a minimum of electrostatic impedance.

A further object of the invention is to efficiently dissipate the heat energy generated in the device to substantially eliminate thermal distortion of the elements thereby increasing the operating life of the individual components.

Another object of the invention is to maintain high insulation between the separate electrodes of the device while at the same time providing readily demountable substantially vacuum-tight seals between the parts of the vessel enclosing the discharge path.

A further object of the invention is to insure constant linearity of the multiple sections of the electron emitting filaments and maintain uniform spacial relation thereof with respect to other cooperating electrodes in the device.

A still further object of the invention is to improve the mechanical stability of the supporting structures of the separate electrodes to increase the useful life of the device.

Another object of the invention is to facilitate the fabrication of the elongated internal electrode assembles to eliminate vibrational forces in the structure.

A further object of the invention is to avoid damage to the multiple conductor seals of the filaments where they emerge from the top casing of the device; and Another object of the invention is to inhibit the effect of the intense heat energy in the discharge path on the tension spring assemblies of the filament sections thereby preserving their resilient characteristics over long periods of operation.

These objects are attained in accordance with this invention in a high power demountable discharge device having power ratings of 500 kilowatts or higher in which an intermediate cylindrical anode portion of large diameter having a water-jacket casing is sealed at opposite ends to vitreous hollow columns provided with sealed flange terminations. One of these columns is joined to a continuously operated oil diffusion pump which forms the base of the device while the oppositely disposed column is connected to a channeled metallic collar having connections for supplying a cooling fluid to the channels. A short hollow vitreous column is interposed between the cooling collar and a metallic closure cap, the column being provided with sealed flange terminations to facilitate clamping to the collar and cap, respectively.

The closure cap is provided with a plurality of permanently sealed insulated terminal conductors disposed in a circular boundary about a central hollow fluid-cooled standard extending downwardly into the anode portion of the device, the standard supporting multiple filament sections to supply a copious source of electron emission in the discharge path to the anode. The filament sections are distributed in parallel and uniform spaced relation with respect to the internal anode surface by the standard and are held under uniform tension by rods extending through guide plates supported on the standard and connected to insulated helical springs located in a romote portion of the device where they are protected from the intense heat energy dissipated in the anode discharge path.

The channeled collar supports the control electrode or grid of the device which involves a plurality of U-shaped tubular sections mounted in parallel overlapping relation in a circular boundary. The free ends of the sections are extended outwardly and coupled to the inlet and outlet channels of the collar while the overlapping curved ends are secured together to form a rigid truss structure. A wire helix surrounds the sections along the length of the filaments and is disposed between the filaments and the surface of the anode.

In this construction the grid and filament assemblies are adequately insulated from the high potential anode and from each other by insulating columns of high dielectric strength and the pump is similarly insulated from the anode at the opposite end. Furthermore, these columns are hermetically sealed to flange terminations which cooperate with flange portions of the metallic components of the structure to provide demountable sections whereby any part which might fail or be damaged during operation may be readily replaced with a minimum loss of time in service.

A feature of this construction is the location of the filament and grid supporting structures as far as possible from the immediate intense heat zone within the anode area thereby maintaining such structures relatively cool so that excessive expansion and contraction forces are not apt to distort or fracture delicate parts thereof or deleteriously affect functional characteristics of the components entering into the proper alignment of the sections of the filaments and the grid. However, these supporting structures are not excessively spaced from the anode longitudinally so that the over-all length of the device is prohibitive thereby avoiding serious inherent vibrational distortion problems which would materially affect the operating characteristics of the device.

Another feature of the invention relates to the further protection of the tension springs supporting the filament sections whereby the current supplied for heating the filaments to emission temperature is by-passed around the springs to offset heating of the springs which would deleteriously affect them by such thermal energy dissipation therein. This arrangement involves auxiliary conductive sleeves connected in parallel to the filaments and coupled through compound expansion spring suspensions to the terminal conductors. The sleeves are connected to arcuate springs which in turn are bridged in pairs by other springs centrally connected to the lead-in conductors sealed into the closure cap of the device. These spring groups are mounted in oriented relation on two levels to facilitate adequate movement of the spring assemblies without danger of reducing the space insulation resistance between adjacent groups of filaments.

The filament assembly also involves a central water-cooled standard of rugged construction to support the filament sections in uniform parallel relation under suitable tension to insure constant paraxial symmetry with respect to the grid and anode surfaces. This condition is realized by the insulated tension springs secured to a rigid ring mounted on the standard, the springs being attached to guide rods slidably mounted in jewel bearing discs also mounted on the standard and the rods being joined to the filament sections which are attached on the opposite ends to a mounting block carried by the end of the standard.

The central standard extending downwardly from the closure cap is formed of concentric tubular members to facilitate efficient cooling of the filament assembly so that a sufficient head of water is injected into the central tube to provide a rapid exchange of heat energy from the outer tubular member exposed to the heat generated in the device, the cooling fluid flowing through openings in the lower end of the central tube and passing through a cylindrical chamber formed between the concentric tubular members of the standard.

Another feature of the invention relates to the coaxial alignment of the grid and filament assemblies with respect to the anode since the relatively long length of these assemblies ordinarily would make alignment extremely difficult. This is accomplished by tapering the contact surfaces of the grid cooling collar with respect to the connecting flanges thereof so that accurate alignment of the grid assembly with respect to the anode and the same manipulation of the filament assembly with respect to the grid can be obtained before the collar is finally affixed to the flange connections.

Another feature of this construction is the assembly of the concentric tubes in the standard to facilitate easy fabrication and ready repair of defective parts. This is accomplished by providing a slotted guide ring on the filament clamping block at the lower end of the assembly, then mounting the outer tubular member in the block in relation to the ring and finally sliding the inner tubular member within the outer member until it fits snugly over the guide ring at the terminus of the standard.

Another advantage of this construction relates to the cooling of the grid assembly and the coupling of the upright hollow elements of the grids to the channel cavities in the grid supporting collar which forms a section of the enclosing receptacle of the device. The grid uprights are tubular U-shaped sections having their ends extending radially and coupled to the inlet and outlet channels of the grid collar through which the cooling fluid is circulated. These sections are overlapped to provide a substantially rigid assembly which forms a supporting body for the continuous grid winding around them. Furthermore, the wire grid is maintained in uniform spaced relation with respect to the filaments and anode surface and can withstand considerable temperature changes without distortion due to the strong truss construction.

These and other features and advantages of the invention are set forth in the following detailed description which, together with the accompanying drawings, disclose the constructional assembly of an improved demountable high power discharge device of 500 kilowatt rating.

Figure 1:
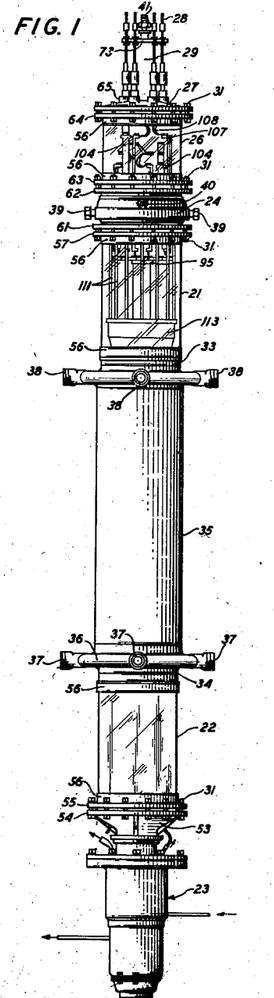
Fig. 1 is a view in elevation of the device of this invention showing the allocation of the various electrodes separated by insulated sections with demountable joints and the continuously operated evacuating pump at the base of the device.
Figure 2:
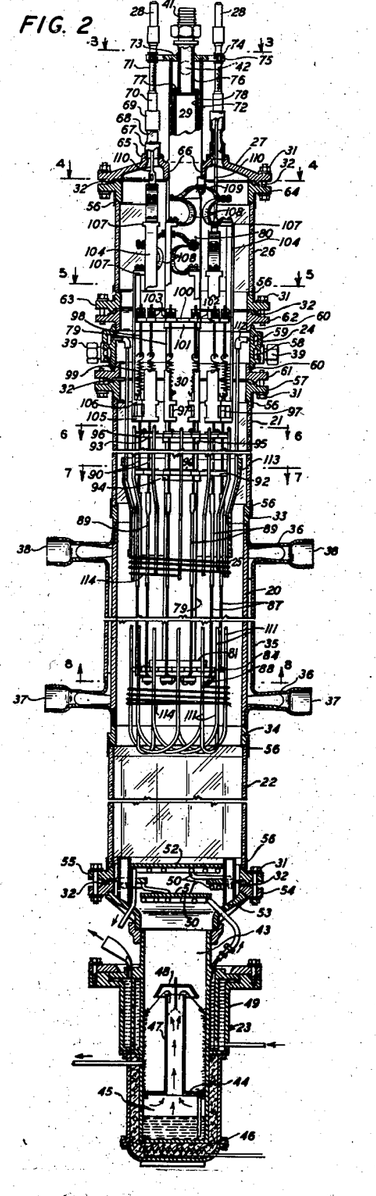
Fig. 2 illustrates the device of Fig. 1 slightly enlarged in longitudinal section with portions foreshortened to reduce the length and showing the detailed internal assembly of the electrodes.

Referring to the drawings and particularly to Figs. 1 and 2, the continuously evacuated high power electronic discharge device of this invention is composed of a series of demountable tubular conducting and insulating sections including an intermediate anode portion 20, terminated by vitreous columns 21 and 22, and a vacuum pump 23, of the oil diffusion type, forming the base of the device and being joined to the column 22. The column 21 is similarly joined to a fluid cooled collar 24 supporting a grid or control electrode 25, and a short vitreous column 26 is secured intermediate the collar 24 and a closure cap 27 which is provided with terminals 28 and a central fluid cooled standard 29 for supporting a filamentary assembly 30 extending into the anode 20 in symmetrical relation to the grid and anode surfaces. The metallic sections 23, 24 and 27 are provided with flanged portions which cooperate with hermetically sealed flanged terminations on the remote ends of the insulating columns 21 and 22 and the opposite ends of the column 26 whereby adjacent sections may be removably joined together, for example, by clamping bolts 31, to form airtight joints between the sections through the interposed yieldable gaskets 32 locked in the joints.

Figure 5:
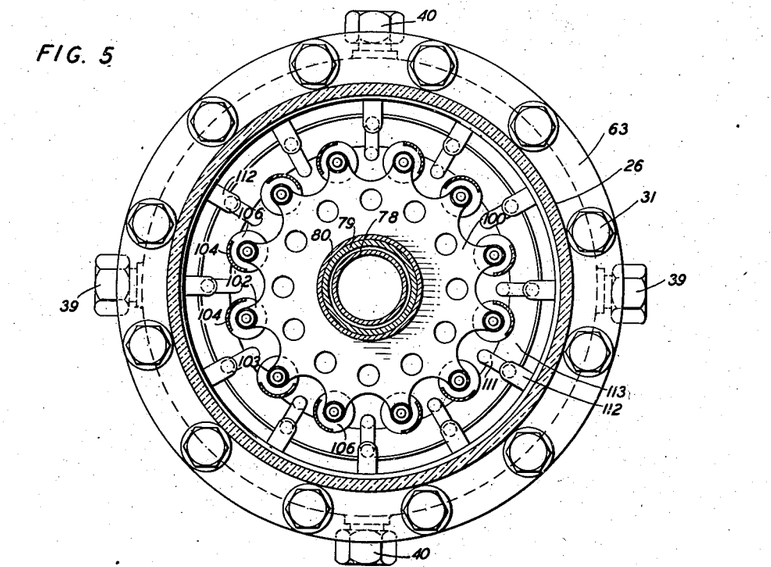
Fig. 5 illustrates in cross-section a view on line 5—5 of Fig. 2, showing the assembly relating to the tensional support of the filament sections.

The anode portion 20 is permanently attached to the oppositely disposed columns 21 and 22 by rings 33 and 34 which are hermetically sealed to the columns and the anode is surrounded by a cooling jacket 35 having expanded end portions 36 provided with inlet and outlet ports 37 and 38 for the circulation of a cooling fluid therein to dissipate the intense thermal energy generated in the discharge path and conveyed to the anode by conduction. The control electrode external collar 24 is provided with inlet and outlet ports 39 and 40, Fig. 5, for cooling the grid upright supports and the standard 29 is also provided with inlet and outlet ports 41 and 42 for circulating a cooling fluid in the standard to dissipate the heat energy along the axis of the device. The general assembly forms a highly evacuated electronic discharge device having a power output of 500 kilowatts, the internal diameter being approximately 8½ inches and the over-all length being approximately 9 feet. The construction affords an efficient structure having demountable joints whereby repairs may be easily accomplished to replace damaged elements or parts of the casing or the internal assemblies without causing total loss of the device and in effecting renewals with a minimum loss of service time during operation of the system in which the device is installed. Furthermore, due to the length of the structure and the increased intense heat energy generated in the device to attain the required output power, considerable distortion and mechanical strain in the internal elements must be overcome to provide a highly efficient and stable assembly both from a mechanical and electrical standpoint to insure a long operating life substantially free from breakdown difficulties.

This is accomplished by the structural features of the device of this invention in which the oil pump 23 forms the base of the assembly and generally includes a metallic chamber or housing 43 having a baffle 44 therein, separating the chamber from a reservoir 45 containing a diffusible or vaporizable material, such as diethlyl hexyl sebacate which is energized by a heater element 46 below the reservoir to generate a supply of vapor in a highly diffused state through a central column 47 provided with a truncated conical cap 48 to propel the vapor downwardly toward the wall of the chamber to create a suction pressure leading towards the outlet of the pump. The wall of the chamber is surrounded by a fluid-cooled jacket 49 which is provided with couplings to pass the cooling fluid through coils 50 adjacent baffle plates 51 and 52 mounted in the throat of the pump. While an oil diffusion pump is described as one element of the device of this invention, it is, of course, understood that any other type of vacuum pump may be substituted in the construction since the specific oil pump is merely described as an example of a vacuum producing component of the assembly to insure the attainment of a sufficiently high vacuum condition in the discharge path of the device.

The upper end of the pump housing is joined to a flared ring member 53 having a flange portion 54 provided with a ground seat and a similar flange member 55 is mounted in juxtaposed relation thereto with a gasket 32 therebetween, the flanges 54 and 55 being clamped together, for example, by bolts 31. The opposite inner rim of flange member 55 is machined to a plane surface to form a seat for the ground end of a vitreous heavy walled column or sleeve 22, preferably of "Pyrex" or borosilicate glass. This vitreous sleeve is hermetically sealed to the flange member 55, as shown more clearly in Fig. 11, by a silver solder joint produced by coating a band on the exterior of the column adjacent the flange with metallic silver, in paste form, which is baked and polished to provide a uniform metallic surface contiguous with the vitreous surface. The silver surface is tinned with a lead-free solder, such as 89 per cent tin and 11 per cent silver and the flange surface is similarly tinned and a copper or phosphor bronze band or ring 56 is seper curely brazed to the tinned surfaces to form a vacuum-tight seal. Since the full thickness of the glass column bears on the flange seat the joint can support the full pressure that the glass is capable of withstanding. The metal band 56 should be thick enough to hold the column 22 in proper alignment with the flange yet sufficiently thin to compensate for differences in expansion and contraction between the metal and the glass. However, the ring is backed by the full thickness of the glass column at all points so that there is no danger of collapse or rupture of the seal. The opposite end of column 22 is similarly sealed to ring 34 by a metallic band 56 silver-soldered thereto to complete one of the main insulating sections between the pump and the anode portion.

The anode section 20 is formed of a long tubular member, preferably of copper, having a diameter substantially the same as the column 22 and ring 34 and each end thereof is fused into an undercut seat in rings 33 and 34 with a high melting point solder to form a leak-proof and rigid joint. A pair of hollow toroidal end portions 36 are joined to opposite external ends of the tubular anode adjacent the rings 33 and 34 with the oppositely disposed cylindrical extensions thereof being spaced in aligned relation from the surface of the anode and being coupled together by a sleeve portion 35 to form a jacket. Each toroidal end portion is provided with radial tubulations distributed in quadrature relation to form inlet and outlet connections 37 and 38, respectively, to supply a cooling fluid which flows along the cylindrical surface of the anode in the constricted chamber extending from the inlet 37 to the outlet 38 in parallel sectional paths. This anode and jacket construction is similar to that disclosed in United States Patent 1,984,548, issued December 18, 1934, to V. L. Ronci et al. The ring 33 at the top of the anode section is sealed to vitreous column 21 by a copper band 56 and silver solder joint, as heretofore described, and the opposite end of column 21 is similarly sealed to a metallic flange ring member 57.

Figure 9:
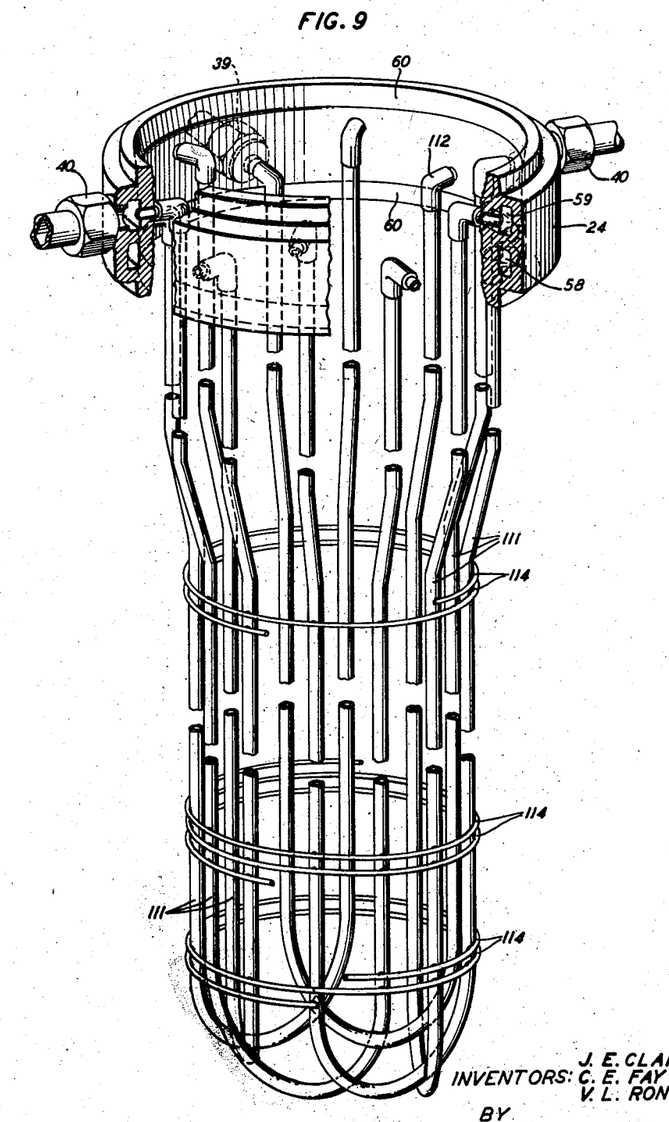
Fig. 9 illustrates a perspective view of the control electrode assembly showing the overlapping truss structure of the uprights and portions broken away to show the connection of these uprights to the supporting collar and the joint between one of the couplings and the channel in the collar.

The collar member 24, as shown more clearly in Fig. 9, is a metallic ring having vertically aligned rectangular shaped toroidal openings 58 and 59 formed therein to function as inlet and outlet channels, respectively, for circulating a cooling fluid therethrough, the channel 58 being provided with oppositely disposed couplings 39 to facilitate joining hose connections thereto and the channel 59 having transversely disposed couplings 40 for similar hose connections to circulate water or other cooling fluid therethrough. The collar 24 is provided with exterior tapered or truncated conical surfaces 60, which are secured, for instance by soft solder, at opposite ends to cylindrical extensions of flange rings 61 and 62 and a similar flange ring 63 is mounted against the flange 62 whereby the water-cooled collar 24 may be easily demountable by the removal of the clamping bolts and gaskets between the respective pairs of flange rings 57—61 and 62—63. The short vitreous column 26 is hermetically sealed to the flange ring 63 on one end and a similar flange ring 64 on the other end by the copper band-silver solder seal, as previously described, and a metallic cover cap 27 terminates the upper end of the enclosing vessel of the device and is clamped to the flange ring 64 by bolts in the same manner as heretofore described in connection with the demountable joints employed in this invention.

Figure 3:
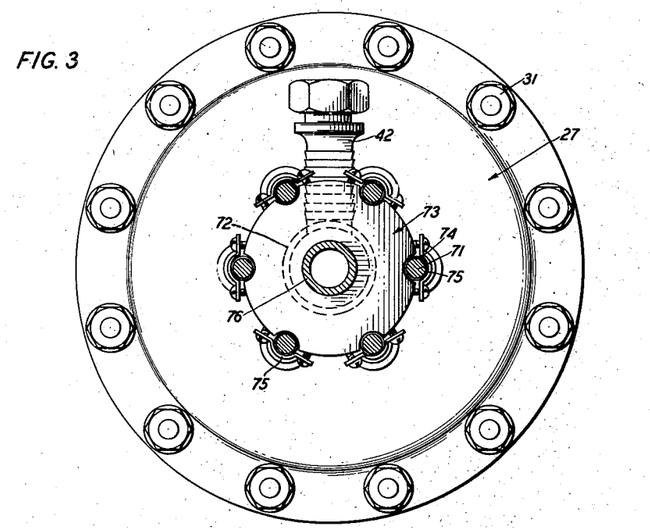
Fig. 3 is a plan view of the top closure of the device taken on the line 3—3 of Fig. 2 and showing the distribution of the current conductors and central standard extending from the closure.

The closure cap 27 is provided with six outwardly extending integral ferrules 65 forming small diameter apertures arranged in space relation on a circular boundary and surrounding a large diameter opening formed by an inwardly projecting shoulder extension 66. The ferrules support tubular insulated seals of identical construction which are formed of a copper tube 67 soldered into the ferrule, the tube having a knife edge rim welded to a vitreous sleeve 68 and terminated by a copper cup member 69 also having a knife edge rim welded to the sleeve 68, the cup member being provided with a cylindrical extension 70 having sockets in opposite ends thereof. A flexible braided solid conductor 71, preferably of copper, extends linearly from the exterior socket of the extension 70 and carries a rigid cylindrical terminal 28 on the free end of the conductor. A tubular metallic upper casing portion 72 extends through the shoulder extension 66 and is soldered thereto intermediate the ends of the casing, the outer end of the casing being fitted and soldered into a circular slot of an annular spacer plate 73 having a serrated periphery to accommodate the six flexible conductors extending around the rim thereof. An insulating band 74, such as mica, surrounds each conductor in contact with the serrated edge of the plate and a clamping strap 75 secures each conductor to the plate with screws, as shown more clearly in Fig. 3. A small diameter nipple 76 is secured centrally in the annular plate 73 and is provided with a coupling connection 41 to fasten a supply hose thereto. The inner end of the nipple is attached to an annular ring 77 which supports an elongated tubular member 78 extending coaxially within the tubular casing 72 and providing a cylindrical passageway therebetween of small cross-section for the outlet flow of the cooling fluid to outlet coupling 42 in the casing wall intermediate the plate 73 and the ring 77. This construction affords a rigid supporting assembly for the series of conductors extending a considerable distance from the closure cap 27 so that mechanical strains do not affect the insulated seals joined to the cap. Furthermore, the central casing forms a large dimension base to maintain stable relation between the various conductors and facilitates easy access to couple the hose connections to the casing for the circulation of a fluid along the axis of the device.

Figure 12:
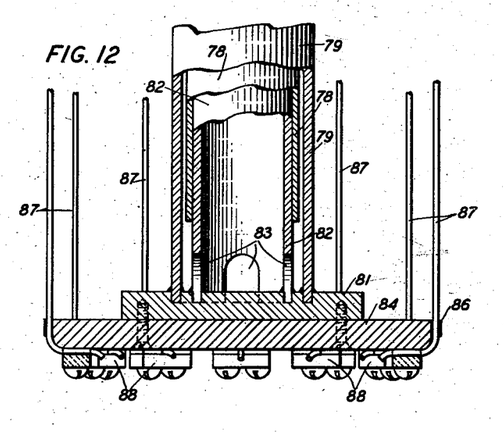
Fig. 12 is an enlarged view partly in cross-section of the internal assembly of the lower end of the fluid-cooled central standard.

A relatively long tubular casing member 79 coaxially encloses the tubular member 78 and is coupled to the upper casing member by a sleeve section 80, the lower end of the casing 79 extending slightly beyond the end of the inner member 78, as shown in Fig. 12. A metallic disc 81 having concentric grooves on one surface supports a guide sleeve 82 mounted in the inner groove and the elongated tubular member 78 slidably engages the sleeve to complete the inlet channel of the cooling casing. The long casing member 79 is soldered into the outer groove in the disc and the guide sleeve is provided with a plurality of cut-out portions 83 adjacent the disc to form communicating openings from the inlet channel to the outlet channel extending between the coaxial tubular members 78 and 79 of the casing. The disc 81 also forms a base for a mounting plate 84, of larger diameter, having a scalloped periphery 85, Fig. 8, with parallel notches 86 formed in the edge of the plate intermediate the scalloped portions. The slidable connection between the guide sleeve 82 and the inner tubular member 78 allows suitable longitudinal movement of the inner member due to expansion and contraction of the standard and avoids distortion stresses affecting the proper functions of the device.

Figure 6:
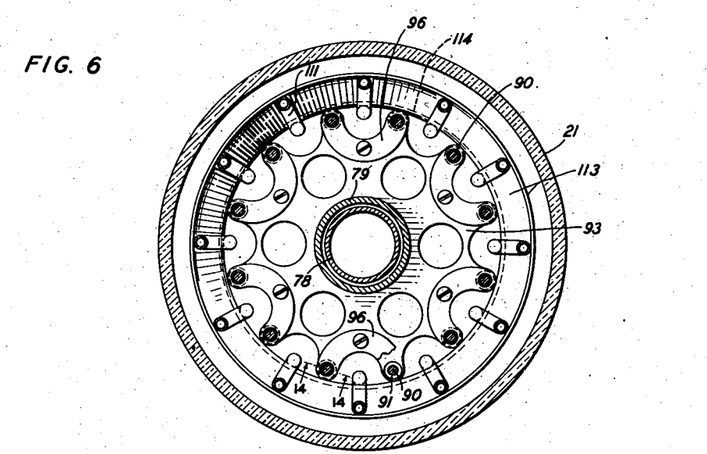
Fig. 6 is a cross-sectional view on the line 6—6 of Fig. 2.
Figure 7:
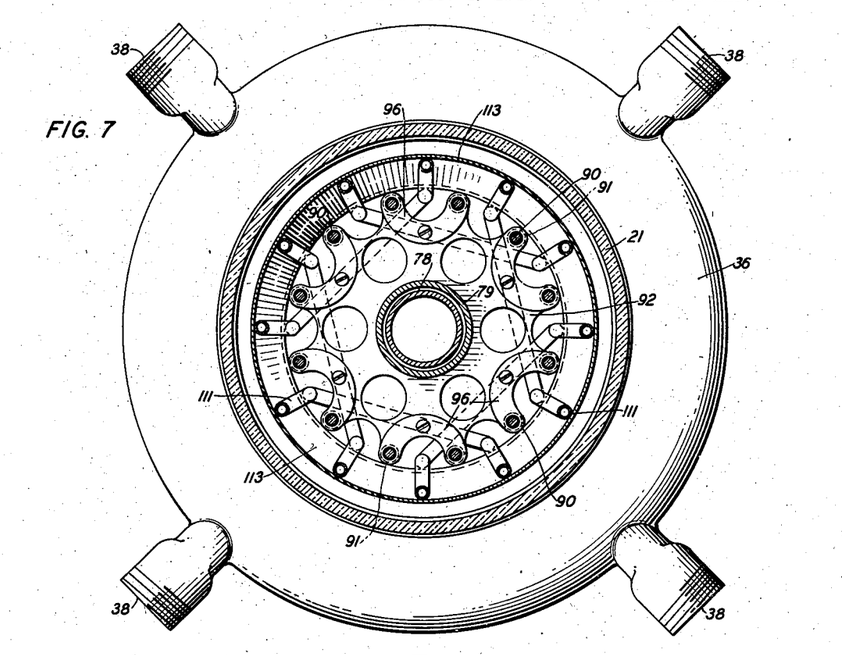
Fig. 7 is a view in cross-section of the device of Fig. 2 on the line 7—7.
Figure 10:
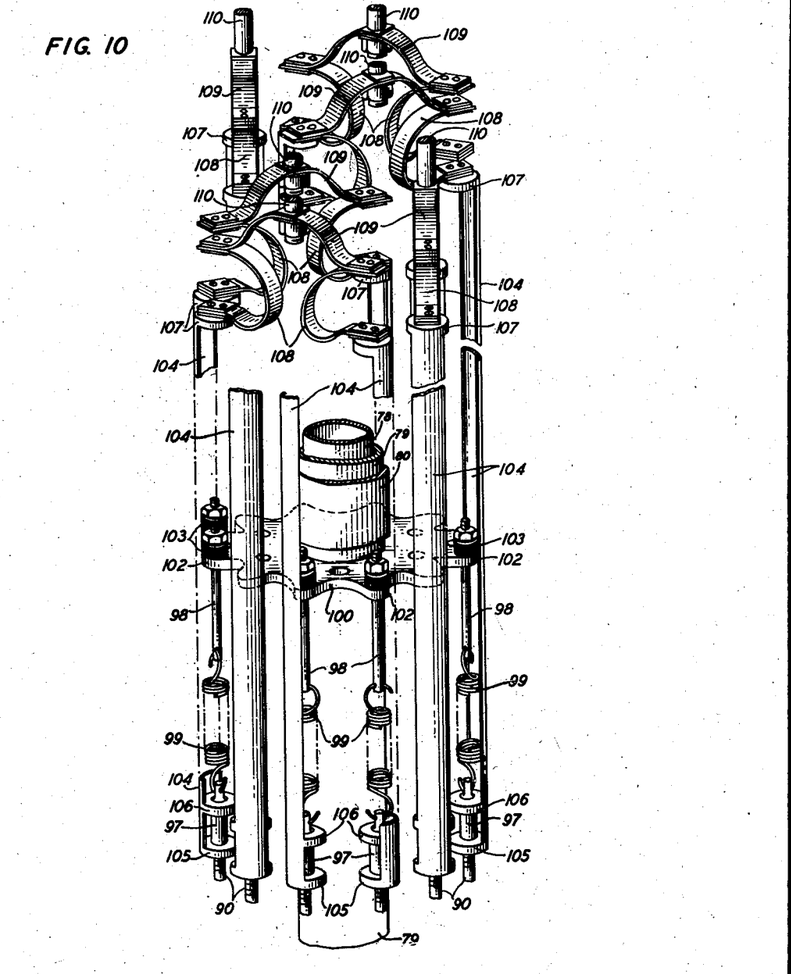
Fig. 10 is an enlarged perspective view of a portion of the filament assembly illustrating the spring supporting arrangement of the multiple filament strands in the device.
Figures 11, 13, 14:
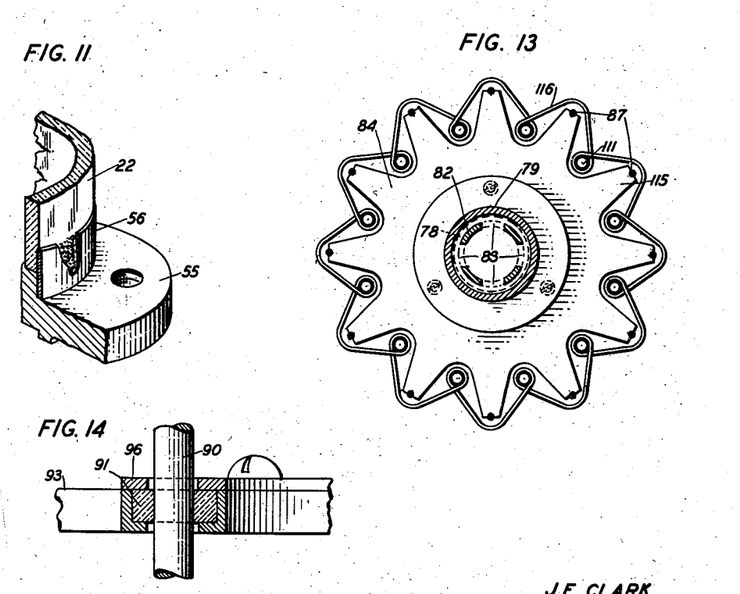
Fig. 11 illustrates, in perspective, a sectional view of the assembly of the hermetic seal of the demountable joint between the metallic flange and insulating column shown in Figs. 1 and 2.
Fig. 13 is a plan view, partly in section, of a modified arrangement of the grid and filament assemblies to show the configuration of the grid winding and the supports thereof disposed concentrically within the boundary of the filament strands.
Fig. 14 is an enlarged view in cross-section of the mounting of the frictionless bearing in the guide plates, taken on the line 14—14 of Fig. 6.

A plurality of filamentary strands or sections 87, preferably of drawn tungsten, are located in the notches and are clamped around the edge of the plate 84 by metallic blocks 88 to extend upwardly in parallel relation on a circular boundary almost to the upper end of the anode portion 20 of the device. These sections are embedded in rigid connectors 89 threaded to linear guide rods 90 extending through frictionless jewel bearings 91 secured in recesses, as shown in Fig. 14, formed in the tortuous rim of a pair of mounting plates 92 and 93 supported in spaced relation on the central casing by stop rings 94 and 95, respectively. The jewel bearings are held in the recesses of the plates by arcuate retainer strips 96, Figs. 6 and 7. The guide rods are terminated by couplings 97, Fig. 10, having eyeleted ends and are interconnected to oppositely disposed suspension rods 98 by linearly arranged helical tension springs 99 extending between guide plate 93 and a final mounting plate 100 secured to the casing by a stop ring 101. The suspension rods 98 extend through radially projecting portions 102 of the plate 100, Fig. 5, formed by the reticulated periphery of the plate and are insulated from the plate by ceramic bushings 103 held in the plate due to the threaded nut superimposed on the bushings. This construction insures a rugged assembly for the multiple filament sections in which the central cooling casing forms a longitudinal standard along the whole length of the filament assembly to prevent distortion strains affecting the sections. Furthermore, the sections are maintained in collateral relation and substantially free from vibrational stresses due to the uniformity of tension and the alignment of the supporting components of the filament sections. Other advantages of this construction are the displacement of the tensioned springs away from the intense heating zone in the vicinity of the anode portion of the device and the efficient cooling of the complete filament mounting along the axis of the device.

Figure 4:
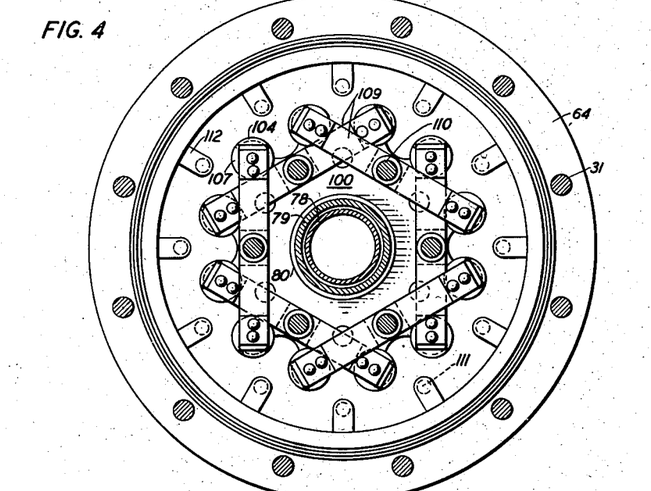
Fig. 4 is a view in cross-section of the device taken on the line 4—4 of Fig. 2 illustrating the arrangement of the conductors attached to suspension spring assemblies for the multiple filament sections.

The heating current necessary for bringing the filament sections to suitable operating temperature in order to supply the high electronic emission flowing to the anode 20 would greatly endanger the resilient properties of the tension springs 99 supporting the filament sections and, according to this invention, this deleterious heating effect of the springs is overcome by conveying the current to the filament sections through auxiliary conducting members which parallel the springs but by-pass the current to the filament sections without affecting the springs. This is accomplished by joining rigid metallic split sleeves 104, preferably of copper, and of arcuate cross-section, to the guide rods 90 adjacent the couplings 97 and arranging them to partially encircle the springs and the radial portions 102 of the mounting plate 100, alternate pairs of adjacent sleeves being of different lengths to terminate them in two planes or levels thereby insuring adequate spaced relation and high insulation paths between the collateral conducting elements. The lower end of each sleeve is provided with a pair of spaced centrally perforated disc portions 105 and 106 which are engaged by the coupling 97, the portion 105 forming a stop member against the abutting shoulder of the coupling. The upper end of each sleeve is provided with a single disc portion 107 to which is attached a vertically arranged arcuate leaf spring 108, the curved portion of pairs of springs being positioned in angular quadrate relation, i. e., pairs of springs are connected to sleeves spaced in quadrifilar relation in each level and the springs being aligned in converging but spaced relation, as shown in Fig. 10. The springs in each layer or plane are, therefore, mounted in triangular configuration with the springs in one plane or level being in directly opposite relation to the springs in the other level, as illustrated in Fig. 4. Each pair of springs is then joined, for example, by rivets, to a bridging lead spring 109 having a convex contour and the center of each bridging spring is secured to a rigid conductor 110 extending from the sealed terminal socket 70 on the closure cap.

These triangularly arranged spring assemblies, therefore, interconnect the current conductors sealed in the stem or closure cap to the conducting sleeves which are coupled to the filament sections so that heating current may be supplied to the filaments. Furthermore, they compensate for expansion and contraction of the filaments during operation and therefore maintain the filament sections in uniform lateral relation with respect to the active surface of the anode of the device. They also relieve the tension springs from sudden changes in thermal conditions in the device and neutralize twisting stress between the conducting sleeves and conductors which might cause cracks or fractures in the insulating seals in the closure cap. It will be noted that the compound spring assemblies are further removed from the high intensity heat zone of the anode discharge path and are maintained at a low temperature by the shielding effect of the mounting plate 100 and the cooling effect of the central fluid-cooled casing or standard so that initial expansion of the springs does not impose torsional strain on the split sleeves or the conductors. Furthermore, the pairing of the multiple filament sections in quadrifilar relation to the compound spring assemblies uniformly distributes the suspension load on the springs and facilitates the grouping of the filaments to the terminal conductors extending from the device. The coupling of pairs of filaments lying in fourth relation to each other to different conductors equalizes the effect of the heating current flowing in adjacent sections so that the phases are in equal and opposite directions whereby detrimental hysteresis effects are neutralized and the electric fields around the filament sections do not seriously impede the flow of electrons across the discharge path to the anode.

The control electrode or grid 25 surrounding the filament assembly and coaxially spaced from the anode portion of the device is fluid cooled to maintain stable spaced relation thereof with respect to the other cooperating electrodes and also is rigidly constructed to prevent warping and to offset torsional stresses therein due to the length thereof. This is accomplished, in accordance with this invention, by forming the parallel uprights of the grid into U-shaped tubular frame members 111, as shown more clearly in Fig. 9, having elbow joints 112 on the ends thereof, one being connected to the inlet channel 58 in the external collar or grid cooling jacket 24 and the other being connected to the outlet channel 59 of the jacket. The circulation of a cooling fluid through the grid frame dissipates the heat energy conducted to the grid due to its interjacent relation with respect to the incandescent filament sections and the high potential anode and also decreases the effect of secondary emission from the grid which normally counteracts the flow of primary emission between the filament sections and the anode. The U-shaped frames are mounted in parallel relation on a circular boundary with the bent portions adjacent the lower end of the anode portion 20 in overlapping relation to form a rigid truss construction, the crossing points of the frames being soldered to combine all the frames into an integral unit.

Figure 8:
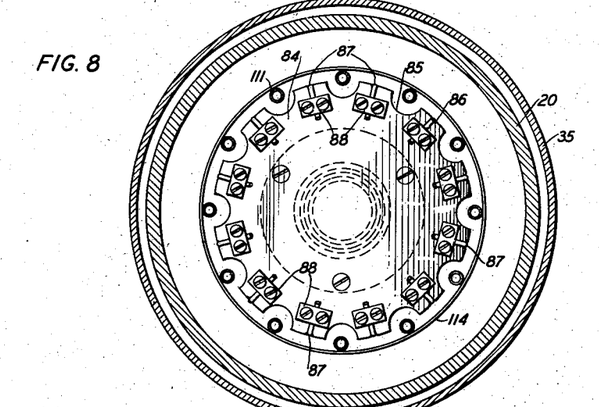
Fig. 8 is a cross-section on the line 8—8 of Fig. 2 showing details of the lower end of the filament assembly and standard.

The parallel legs of the frame members are spaced in quadrifilar relation so that the return leg of one frame is connected to an outlet opening in the grid collar jacket 24 which is spaced in fourth place from the inlet opening of the other leg of the frame member. The other frame members are distributed in like manner with the elbow joints in staggered relation and equally spaced adjacent the inner periphery of the grid collar 24. The frame members extend parallel to the split sleeves 104 and the guide rods 90 of the filament assembly and are bent inwardly beyond the lower guide plate 92 to bring the remainder portions of the frames closely adjacent and equally spaced between the parallel filament sections 81, as shown in Fig. 8. The inwardly bent portions of the frame are surrounded by a wide reenforcing collar 113 and a helical wire grid 114 embraces the frame members and is welded thereto over a length from the collar 113 to a point beyond the end of the filament assembly. This winding also extends along the whole length of the anode portion 20.

Since the grid assembly is rigidly affixed to the collar 24 and the long frame structure extends down into the anode portion 20 it would be difficult to secure proper coaxial space relation between these elements unless suitable compensating adjustments were provided to attain such relationship. When the grid frame assembly is mounted within the anode portion 20 with the collar 24 and flange 61 superimposed on the flange 57 the soft solder joint may be heated to allow suitable adjustment of the grid assembly until the grid is accurately coaxial with the inner surface of the anode portion 20 after which the joint between the collar and flange may be finally sealed with solder. Similarly, in mounting the filament assembly within the grid and anode, manipulation of the structure supported above the flange portion 62 may be obtained by heating the solder joint between the flange 62 and the collar to permit the structure to be adjusted by means of the conical joint 60 to properly align the filament assembly coaxially with respect to the grid and anode surfaces. After this adjustment is completed the joint is permanently sealed with solder.

A modification of the cooperative assembly of the filament and grid structures is shown in Fig. 13 to illustrate an alternative arrangement of the grid frames and winding thereon to prevent shielding effect of the filament sections in the cylindrical plane of the filaments. This construction is similar to the grid and filament assembly, heretofore described, except that the grid frames 111 adjacent the lower guide plate 92 are bent inwardly more acutely than in the previously described structure so that the lower portions of the frame are brought closer together within the compass of the filament sections, although these portions are permitted to extend beyond the filament clamping plate 84 by the star-shaped projections 115 on the plate. The convolutions 116 of the grid winding are supported on the grid frames located within the filament sections but the sinuous winding extends outwardly around each filament section between parallel adjacent uprights of the frames.

The individual electrode assemblies are strongly constructed and capable of efficiently cooperating to deliver a high power output over a long period of operating service. It is realized that the high cost of installation and replacement of a device of the size to expend 500 kilowatts of energy, would be prohibitive unless considerable salvage value could be obtained or replacement parts could be substituted in the field without serious loss of time and capital investment. The device of this invention satisfies the second and more influential objective since the demountable features of the components of the device permit easy replacement of any part of the structure which may be damaged by accidental or destructive causes, such as arcing and burn-out, so that repairs may be made expeditiously and accurately to restore the device to its initial utility. Furthermore, the air-tight clamp joints and the metal-to-glass seals between the metallic portions and the insulating columns insure the attainment of a high vacuum discharge in the device during operation, the clamped sections of the device being as far removed as possible from the high temperature zone of the discharge path so that deterioration of the joints is held to a minimum.

While the specific constructional assembly of the device of this invention has been disclosed, it is apparent that many modifications and changes may be made in the fabrication and arrangement of elemental parts of the device without departing from the scope of the invention as defined in the appended claims.

What is claimed is:

1. A high power electronic discharge device comprising a series of enclosure sections including an intermediate water-cooled anode, hollow vitreous columns on opposite ends of said anode, a metallic collar joined to one of said columns, a closure cap at one end, a hollow vitreous sleeve between said collar and cap, parallel terminal conductors extending outwardly from said cap, a hollow standard extending on opposite sides of said cap, said standard projecting substantially to the remote end of said anode, a plurality of filament sections disposed in parallel relation around said standard and attached thereto at one end, dual spring assemblies connecting said filament sections to said conductors, hollow frame members disposed adjacent said filament sections and connected to said collar, and a continuous wire helix carried by said frame members and spaced between said filament sections and the inner surface of said anode.

2. A high power electronic discharge device comprising an enclosure of demountable sections including an intermediate water-cooled hollow anode portion, vitreous hollow columns secured to opposite ends of said anode portion, a channeled metallic water-cooled collar attached to one of said columns, a short vitreous column secured to the opposite end of said collar, a metallic cap portion closing the open end of said short vitreous column, a plurality of terminal conductors projecting from said cap portion, a filament assembly carried by said cap portion, connected to said conductors and extending into said anode portion, and a grid assembly including tubular frame members disposed parallel to said filament assembly and terminated at said channeled collar.

3. A high power electronic discharge device comprising a series of enclosure sections including an intermediate water-cooled anode, hollow vitreous columns on opposite ends of said anode, a metallic collar joined to one of said columns, a closure cap at one end, a hollow vitreous sleeve between said collar and cap, parallel terminal conductors extending outwardly from said cap, a hollow standard extending on opposite sides of said cap, said standard projecting substantially to the remote end of said anode, a plurality of filament sections disposed in parallel relation around said standard and attached thereto at one end, a plurality of tension springs insulatingly supported by said standard and individually connected to each of said filament sections, a plurality of sectional sleeve members coupled to said filament sections in parallel relation to said tension springs, said springs being partially shielded by said sleeve members, multiple suspension springs connecting pairs of said sleeve members to individual conductors in said closure cap, hollow frame members disposed adjacent said filament sections and connected to said collar, and a continuous wire helix carried by said frame members and uniformly spaced between said filament sections and the inner surface of said anode.

4. A high power electronic discharge device comprising a series of enclosure sections including an intermediate water-cooled anode, hollow vitreous columns on opposite ends of said anode, a metallic collar joined to one of said columns, a closure cap at one end, a hollow vitreous sleeve between said collar and cap, metallic flanged rings hermetically sealed on opposite ends of said vitreous columns and sleeve, means for clamping said rings to said anode, collar and cap, respectively, to form air-tight joints therebetween, parallel terminal conductors extending outwardly from said cap, a water-cooled central standard extending on opposite sides of said cap, said standard projecting substantially to the remote end of said anode, a plurality of filament sections disposed in parallel relation around said standard and attached thereto at one end, dual spring assemblies connecting said filament sections to said conductors in pairs, hollow frame members disposed adjacent said filament sections and connected to said collar, and a continuous wire helix carried by said frame members and uniformly spaced between said filament sections and the inner surface of said anode.

5. A high power electronic discharge device comprising a series of enclosure sections including an intermediate water-cooled anode, hollow vitreous columns on opposite ends of said anode, a metallic collar joined to one of said columns, a closure cap at one end, a hollow vitreous sleeve between said collar and cap, parallel terminal conductors extending outwardly from said cap, a hollow standard extending on opposite sides of said cap, said standard projecting substantially to the remote end of said anode, a plurality of filament sections disposed in parallel relation around said standard and attached thereto at one end, a plurality of tension springs insulatingly supported by said standard and individually connected to each filament section, dual spring assemblies connecting said filament sections to said conductors in pairs, said dual springs and tension springs being located in a relatively cool portion of said device intermediate said cap and collar, hollow frame members disposed adjacent said filament sections and connected to said collar, and a continuous wire helix carried by said frame members and uniformly spaced between said filament sections and the inner surface of said anode, said collar having tapered surfaces whereby said frame members and filament sections are coaxially aligned with respect to said anode.

6. A high power electronic discharge device comprising a series of enclosure sections including an intermediate water-cooled anode, hollow vitreous columns on opposite ends of said anode, a metallic water-cooled collar joined to one of said columns, a closure cap at one end, a hollow vitreous sleeve between said collar and cap, parallel terminal conductors extending outwardly from said cap, a hollow water-cooled standard extending on opposite sides of said cap, said standard projecting substantially to the remote end of said anode, a plurality of filament sections disposed in parallel relation around said standard and attached thereto at one end, a plurality of tension springs insulatedly supported by said standard and individually connected to said filament sections, dual spring assemblies connecting said filament sections to said conductors in pairs, a plurality of U-shaped tubular frame members disposed adjacent said filament sections and having radially bent end portions coupled to said collar, said frame members being in overlapping relation in a circular boundary adjacent said filament sections, and a continuous wire helix carried by said frame members and uniformly spaced between said filament sections and the inner surface of said anode.

7. A high power electronic discharge device comprising a series of enclosure sections including an intermediate water-cooled anode, hollow vitreous columns on opposite ends of said anode, a metallic water-cooled collar joined to one of said columns, a closure cap at one end, a hollow vitreous sleeve between said collar and cap, parallel terminal conductors extending outwardly from said cap, a hollow water-cooled standard extending on opposite sides of said cap, said standard projecting substantially to the remote end of said anode, a plurality of filament sections disposed in parallel relation around said standard and attached thereto at one end, a plurality of tension springs insulatingly supported by said standard and individually connected to said filament sections, a plurality of sectional sleeve members coupled to said filament sections in parallel relation to said tension springs, an arcuate leaf spring connected at one end to each filament section, a bridging leaf spring connected to each pair of arcuate springs, said conductors being centrally attached to said bridging springs, hollow frame members disposed adjacent said filament sections and connected to said water-cooled collar, and a continuous wire helix carried by said frame members and uniformly spaced between said filament sections and the inner surface of said anode.

8. In an electronic discharge device, a filament assembly comprising a stem portion having a plurality of terminal conductors sealed therein, a central standard extending from said stem portion, a plurality of spacer members carried by said standard, parallel filament sections disposed in a circular boundary between a pair of said spacer members, a plurality of tension springs supported on another of said spacer members, guide rods attached to said springs and filament sections and slidably movable in the intermediate spacer members, rigid conducting sleeve members connected to said filament sections and extending parallel to said tension springs, and compound leaf spring assemblies joining pairs of said sleeve members to said conductors.

9. In an electronic discharge device, a filament assembly comprising a stem portion having a plurality of terminal conductors sealed therein, a central standard extending from said stem portion, a plurality of filament sections disposed in a circular boundary and attached at one end to said standard, a plurality of tension springs carried by said standard and joined to the other ends of said filament sections, rigid conducting members secured to said filament sections and extending beyond said tension springs, and staggered compound spring assemblies coupling said conducting members to said conductors.

10. In an electronic discharge device, a filament assembly comprising a stem portion having a plurality of terminal conductors sealed therein, a central standard extending from said stem portion, a plurality of filament sections disposed in a circular boundary and attached at one end to said standard, a plurality of tension springs carried by said standard and joined to the other ends of said filament sections, rigid conducting sectional sleeves attached to said filament sections and partially surrounding said tension springs, and leaf expansion springs connecting pairs of said sleeves to said conductors.

11. In an electronic discharge device, a filament assembly comprising a stem portion having a plurality of terminal conductors sealed therein, a central standard extending from said stem portion, a plurality of filament sections disposed in a circular boundary and attached at one end to said standard, a plurality of tension springs carried by said standard and joined to the other ends of said filament sections, rigid conducting members secured to said filament sections and extending beyond said tension springs in parallel relation, and leaf expansion springs connected to pairs of said sleeves and said conductors, said leaf springs being mounted in two levels in triangular opposed relation.

12. In an electronic discharge device, a filament assembly comprising a stem portion having a plurality of terminal conductors sealed therein, a central standard extending from said stem portion, a plurality of filament sections disposed in a circular boundary and attached at one end to said standard, a plurality of tension springs carried by said standard and joined to the other ends of said filament sections, rigid conducting sectional sleeves attached to said filament sections and partially surrounding said tension springs, arcuate leaf springs connected to said sleeves, and bridging leaf springs coupling said arcuate springs in pairs, said conductors being centrally attached to said bridging springs.

13. In an electronic discharge device, a filament assembly comprising a stem portion having a plurality of sealed terminal conductors extending in parallel relation therefrom, a central water-cooled standard extending from said stem portion, a plurality of filament sections surrounding said standard, means interposed between said filament sections and conductors to compensate for expansion and contraction of said sections, said standard having a fluted guide sleeve therein adjacent one end, an inner concentric tubular member within said standard and engaging said guide sleeve, and a reenforcing clamping ring carried by the opposite end of said inner tubular member external to said device and engaging said conductors.

14. In an electronic discharge device, a filament assembly comprising a cap portion having a plurality of sealed terminal conductors extending in parallel relation therefrom, a central hollow elongated standard projecting from opposite sides of said cap portion, a guide member within one end of said standard, a tubular member joined to said guide member and forming with said standard concentric inlet and outlet chambers for the passage of a cooling fluid therethrough, said tubular member projecting beyond said standard, an apertured closure affixed to said tubular member and joined to one end of said standard, means clamping said conductors to said closure, a plurality of filament sections surrounding said standard, means supporting said filament sections under tension, and means interposed between said filament sections and conductors to compensate for expansion and contraction of said sections.

15. In an electronic discharge device, a fluid-cooled control electrode assembly comprising a channeled metallic annular member, a plurality of tubular U-shaped frame members having their terminations connected to said annular member, said frame members extending in parallel relation in a circular boundary, each arcuate portion of said frame members being disposed in overlapping relation to an adjacent portion and secured thereto thereby forming a rigid truss structure, a continuous helical wire embracing said frame members, and a reenforcing collar terminating said helical wire and attached to said frame members.

16. In an electronic discharge device, a fluid-cooled control electrode assembly comprising a metallic annular member having inlet and outlet channel openings therein, a plurality of tubular U-shaped frame members having radially bent portions coupled to said inlet and outlet openings on the inner surface of said annular member, the legs of said frame members extending in parallel relation on a circular boundary, the pair of legs of each member being disposed in quadrate relation to each other and the arcuate portion of the frame members overlapping two adjacent frame members to form a rigid truss structure, a circular band attached to said members intermediate said arcuate portions and said annular member, and a continuous helix attached along the length of said legs between said arcuate portions and said band.

17. In combination, a filament assembly comprising a central standard, a plurality of parallel filament sections supported thereby in a circular boundary about said standard, a control grid associated with said filament assembly including a plurality of upright members having portions disposed in two boundaries of different diameters, the boundary of smaller diameter being along the length of said filament sections whereby these upright portions are disposed within and concentric with the boundary of said filament sections, and a continuous helical winding carried by said upright portions of smaller diametric dimension, said winding having symmetrical sinuous portions extending from pairs of said upright portions around said filament sections and uniformly spaced with respect thereto.

18. A demountable high power electronic discharge device comprising a plurality of tubular sections involving a water-cooled anode portion, vitreous columns on opposite ends of said anode portion, a water-cooled collar on the opposite end of one of said columns, a metallic closure on one end of said device, a vitreous column between said collar and closure, each of said columns having a metallic terminating member hermetically sealed thereto at each end, means for removably securing the terminating members of said columns to said anode portion, collar and closure, respectively, a plurality of insulated parallel terminal conductors hermetically sealed to and projecting from said closure, a central water-cooled standard extending downwardly from said closure to the remote end of said anode portion, a plurality of filament sections supported by said standard and mounted in spaced coaxial relation with respect to the inner surface of said anode portion, compound spring assemblies coupling pairs of said filament sections to said conductors, a plurality of tubular U-shaped frame members coupled to the inner surface of said water-cooled collar, said frame members extending into said anode portion, and a wire grid helix supported on said frame members and uniformly spaced between said filament sections and the inner surface of said anode portion.

19. A high power demountable electron discharge device comprising an intermediate hollow anode portion having passageways for the circulation of a cooling fluid, insulating sleeve portions having metallic flange terminations rigidly clamped to opposite ends of said anode portion, an oil diffusion evacuating pump housing rigidly clamped to one end of one of said insulating sleeve portions and forming the base of the device, a channeled metallic collar clamped to the opposite end of the other sleeve portion, said collar having ports for the circulation of a cooling fluid therein, a cylindrical grid electrode extending coaxially within said anode portion, said grid being formed of a plurality of U-shaped tubular sections arranged in a circular boundary, the free ends of said sections being connected to openings in said channeled collar, a continuous wire helically wound on and encircling said sections, an apertured metallic cap portion, a short insulating sleeve portion clamped intermediate said collar and cap portion, a central hollow standard carried by said cap portion and extending into the space surrounded by said grid electrode and anode portion, means for circulating a cooling fluid through said standard, a block carried by said standard remote from said cap portion, a plurality of insulated terminal conductors projecting from said cap portion, a ring support carried by said standard adjacent said collar, a plurality of parallel tension springs attached to said support, a plurality of filaments extending between said springs and block, individual vented conductive sleeves attached to said filaments and enclosing said springs, and multiple arcuate springs coupling said conductive sleeves to said conductors.

20. A demountable high power electron discharge device comprising a plurality of tubular sections involving a water-cooled anode portion, vitreous columns on opposite ends of said anode portion, a water-cooled collar on the opposite end of one of said columns, an apertured metallic closure on one end of said device, a vitreous column between said collar and closure, a metallic flange member in abutting relation on each end of said vitreous columns, a copper sleeve hermetically sealing the flange members to the adjacent outer surface of said columns, clamping bolts securing said flange members to similar portions on said anode, collar and closure, respectively, parallel insulated terminal conductors extending outwardly from said closure, a central tubular water-cooled standard extending from said closure to a remote end of said anode portion, parallel filament sections supported on one end of said standard in a circular boundary adjacent the inner surface of said anode portion, individual insulated tension springs carried by said standard and connected to said filament sections, bypass conductive members also connected to said filament sections and extending beyond said tension spring, multiple leaf spring assemblies mounted in superimposed relation intermediate said collar and closure and coupling pairs of said filament sections to said terminal conductors, a plurality of tubular U-shaped frame members in parallel overlapping relation having radial end portions connected to the inner surface of said collar, a metallic ring intermediate the ends of and embracing the frame members, and a continuous wire helix surrounding said frame members and attached thereto between said ring and the curved ends thereof.

JAMES E. CLARK.
CLIFFORD E. FAY.
VICTOR L. RONCI.